US011022097B2

(12) United States Patent
Popek

(10) Patent No.: US 11,022,097 B2
(45) Date of Patent: Jun. 1, 2021

(54) TURBINE WITH CYLINDRICAL BLADES

(71) Applicant: Joseph A. Popek, Roswell, NM (US)

(72) Inventor: Joseph A. Popek, Roswell, NM (US)

( * ) Notice: Subject to any disclaimer, the term of this patent is extended or adjusted under 35 U.S.C. 154(b) by 0 days.

(21) Appl. No.: 15/914,171

(22) Filed: Mar. 7, 2018

(65) Prior Publication Data

US 2019/0277250 A1 Sep. 12, 2019

(51) Int. Cl.
*F03D 3/06* (2006.01)
*F03D 3/04* (2006.01)
*F03D 9/25* (2016.01)
*H02K 7/18* (2006.01)

(52) U.S. Cl.
CPC .......... *F03D 3/061* (2013.01); *F03D 3/0427* (2013.01); *F03D 9/25* (2016.05); *H02K 7/183* (2013.01); *F05B 2220/706* (2013.01); *F05B 2230/60* (2013.01); *F05B 2240/12* (2013.01); *F05B 2240/24* (2013.01); *F05B 2240/941* (2013.01)

(58) Field of Classification Search
CPC .......... F03D 3/061; F03D 3/0427; F03D 9/25; H02K 7/183; F05B 2220/706; F05B 2230/60; F05B 2240/12; F05B 2240/24; F05B 2240/941
See application file for complete search history.

(56) References Cited

U.S. PATENT DOCUMENTS

| 2,827,857 | A | * | 3/1958 | Eserkaln | F04C 14/223 |
| | | | | | 418/16 |
| 4,084,918 | A | * | 4/1978 | Pavlecka | F03D 3/0454 |
| | | | | | 415/1 |
| 4,086,026 | A | * | 4/1978 | Tamanini | F03D 1/00 |
| | | | | | 416/176 |
| 4,162,410 | A | * | 7/1979 | Amick | F03D 3/0409 |
| | | | | | 290/55 |
| 4,234,289 | A | * | 11/1980 | Lebost | F03D 3/0481 |
| | | | | | 415/4.4 |
| 4,295,783 | A | * | 10/1981 | Lebost | F03B 13/145 |
| | | | | | 290/54 |
| 4,366,386 | A | * | 12/1982 | Hanson | F03D 1/0616 |
| | | | | | 290/44 |
| 5,577,882 | A | | 11/1996 | Istorik | |
| 8,961,103 | B1 | * | 2/2015 | Wolff | F03D 3/0409 |
| | | | | | 415/4.2 |
| 2003/0133782 | A1 | * | 7/2003 | Holter | F03D 3/005 |
| | | | | | 415/4.2 |

(Continued)

FOREIGN PATENT DOCUMENTS

EP 1010459 B1 6/2000
EP 1913256 A2 4/2008

*Primary Examiner* — Sean Gugger
(74) *Attorney, Agent, or Firm* — Merchant & Gould P.C.

(57) ABSTRACT

A turbine having a rotor assembly with substantially cylindrical blades. A scoop may be used to direct a fluid flow into the turbine, thereby causing a pushing force and/or a suction force to be exerted on at least some of the cylindrical blades. Accordingly, the rotor assembly may rotate within the turbine. In an example, the rotor assembly may include a plurality of magnets, which may cause a magnetic field to fluctuate. Copper discs on the turbine enclosure may be used to generate electricity based on the changing magnetic field. In another example, the turbine enclosure may have one or more openings, which may generate a suction or pressure force as the rotor assembly rotates.

18 Claims, 7 Drawing Sheets

(56) References Cited

U.S. PATENT DOCUMENTS

| | | | | |
|---|---|---|---|---|
| 2008/0166228 A1* | 7/2008 | Chio | .................. | F03D 3/0427 |
| | | | | 415/203 |
| 2009/0169354 A1* | 7/2009 | Kelaiditis | ............... | F03D 3/049 |
| | | | | 415/4.2 |
| 2011/0221196 A1* | 9/2011 | Kawas | ................. | F03D 3/0418 |
| | | | | 290/44 |
| 2012/0187698 A1* | 7/2012 | Bassett | ................. | F03D 3/005 |
| | | | | 290/55 |
| 2013/0277982 A1* | 10/2013 | Choi | .................... | F03D 7/0296 |
| | | | | 290/55 |
| 2016/0084227 A1* | 3/2016 | Krippene | ................. | F03D 9/39 |
| | | | | 290/55 |

\* cited by examiner

TURBINE WITH CYLINDRICAL BLADES

BACKGROUND

Turbines can be used to extract energy from the flow of air, water, or any of a variety of other fluids. However, certain turbine designs may not be easy to assemble, or may be manufactured using specialized parts or expensive materials, resulting in turbines that may not be cost-effective.

It is with respect to these and other general considerations that the aspects disclosed herein have been made. Also, although relatively specific problems may be discussed, it should be understood that the examples should not be limited to solving the specific problems identified in the background or elsewhere in this disclosure.

SUMMARY

In one aspect, the technology relates to: a turbine having: a turbine enclosure including a top, a bottom, a first side, and a second side, wherein an intake is defined at least partially on the first side of the turbine enclosure and an exhaust is defined at least partially on the second side of the turbine enclosure, such that the turbine enclosure is configured to receive a fluid flow therethrough, and wherein the second side is opposite the first side of the turbine enclosure; and a rotor assembly rotatably coupled between the top of the turbine enclosure and the bottom of the turbine enclosure, wherein the rotor assembly defines a rotation axis. In an example, the rotor assembly includes at least one disc disposed about the rotation axis; and a set of substantially cylindrical blades, wherein each blade of the set of blades is coupled to the at least one disc and circumferentially spaced about the rotation axis, and wherein the set of substantially cylindrical blades is at least partially disposed between the intake and the exhaust, such that when the fluid flow is channeled through the turbine enclosure via the intake and the exhaust, the rotor assembly rotates within the turbine enclosure. In another example, the rotor assembly further includes a plurality of magnets, wherein the top of the turbine enclosure includes a set of copper discs, and wherein upon rotation of the rotor assembly, the magnetic field between the plurality of magnets and the set of copper discs changes to generate electricity. In a further example, a third side of the turbine enclosure defines at least one of an exhaust opening, a suction opening, and a pressure opening. In yet another example, the turbine further includes a vane disposed on the top of the turbine enclosure. In a further still example, the turbine further includes a scoop coupled to the intake of the turbine enclosure.

In an example, the exhaust opening extends substantially normal to a direction of the intake. In another example, both the suction opening and the pressure opening extend at a 45° angle relative to a direction of the intake. In a further example, the suction opening is offset 90° relative to the pressure opening. In yet another example, the rotor assembly has two spaced apart discs, the set of blades extending between the two spaced apart discs and substantially parallel to the rotation axis. In a further still example, an inlet size of the intake is approximately equal to an outlet size of the exhaust. In another example, a first cylindrical blade of the set of cylindrical blades has a first weight and a second cylindrical blade of the set of cylindrical blades has a second weight, and wherein the first weight and the second weight are different. In a further example, the set of cylindrical blades has a third cylindrical blade having a weight substantially similar to the first weight, and wherein the first cylindrical blade and the third cylindrical blade are diametrically opposed to each other on the at least one disc. In yet another example, the turbine further includes a shaft opening defined on the top of the turbine enclosure. In a further still example, the rotor assembly further includes a shaft coupled to the at least one disc, and wherein the shaft extends through the turbine enclosure through the shaft opening.

In an example, the shaft is coupled to an electric generator, and wherein upon rotation of the rotor assembly, the shaft rotates to generate electricity. In another example, the rotor assembly includes a spacer, the spacer extending between the two spaced apart discs and substantially parallel to the rotation axis. In a further example, the turbine enclosure defines an interior cavity, wherein the interior cavity is substantially cylindrically shaped and centered about the rotational axis. In yet another example, the rotor assembly is rotatably coupled between the top of the turbine enclosure and the bottom of the turbine enclosure by a first bushing disposed on the top of the turbine enclosure and a second bushing disposed on the bottom of the turbine enclosure.

In another aspect, the technology relates to: a method of assembly for a turbine. The method includes: defining a turbine enclosure having a top, a bottom, a first side, and a second side, wherein an intake is defined at least partially on the first side of the turbine enclosure and an exhaust is defined at least partially on the second side of the turbine enclosure, such that the turbine enclosure is configured to receive a fluid flow therethrough, and wherein the second side is opposite the first side of the turbine enclosure; and rotatably coupling a rotor assembly between the top of the turbine enclosure and the bottom of the turbine enclosure, wherein the rotor assembly defines a rotation axis. In an example, the rotor assembly includes: at least one disc disposed about the rotation axis; and a set of substantially cylindrical blades, wherein each blade of the set of blades is coupled to the at least one disc and circumferentially spaced about the rotation axis, and wherein the set of substantially cylindrical blades is at least partially disposed between the intake and the exhaust, such that when the fluid flow is channeled through the turbine enclosure via the intake and the exhaust, the rotor assembly rotates within the turbine enclosure. In another example, the rotor assembly further includes a plurality of magnets, wherein the top of the turbine enclosure includes a set of copper discs, and wherein upon rotation of the rotor assembly, the magnetic field between the plurality of magnets and the set of copper discs changes to generate electricity.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

There are shown in the drawings, embodiments which are presently preferred, it being understood, however, that the technology is not limited to the precise arrangements and instrumentalities shown.

DETAILED DESCRIPTION

Figure 1:
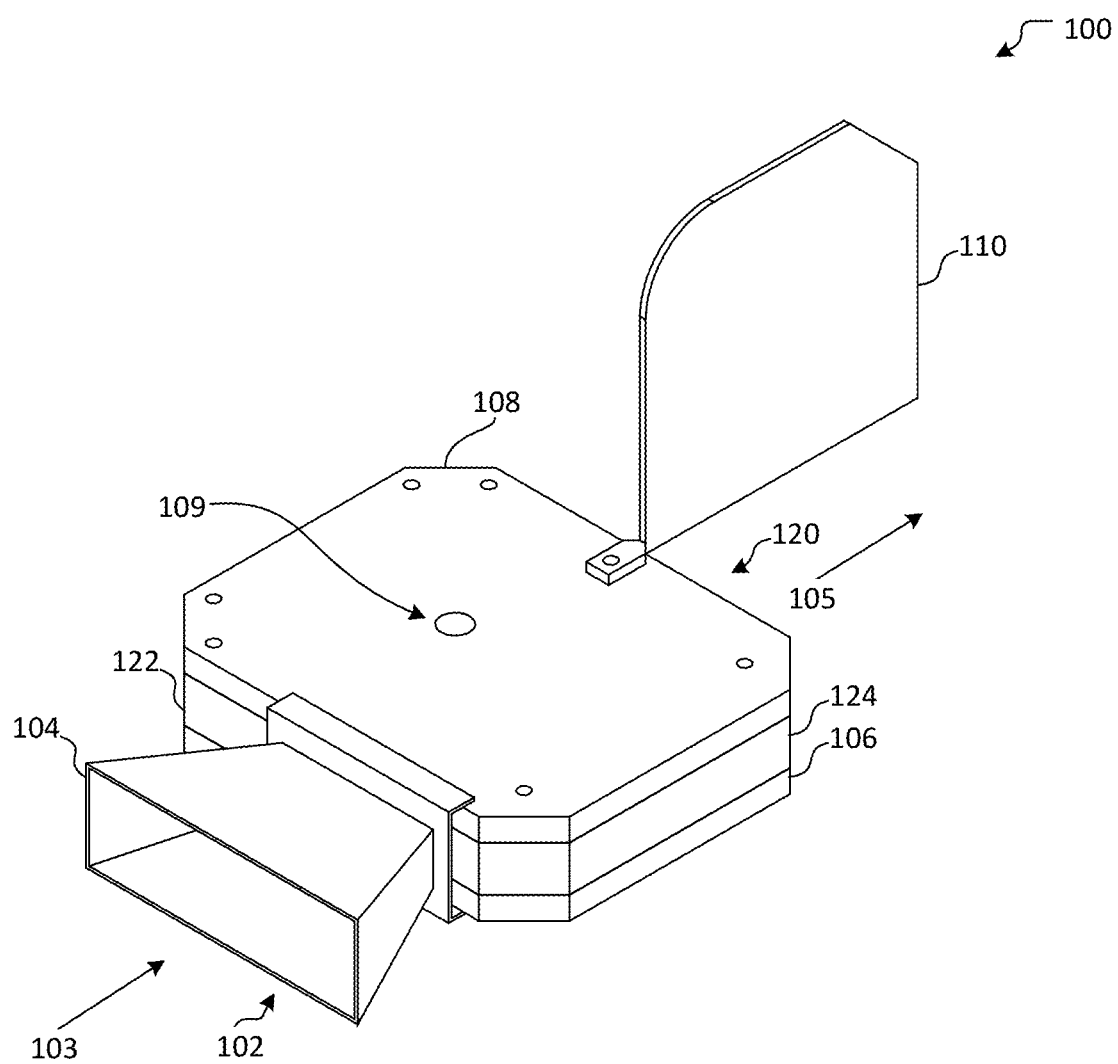
FIG. 1 depicts a front right perspective view of an example turbine.

Various aspects of the disclosure are described more fully below with reference to the accompanying drawings, which form a part hereof, and which show specific example aspects. However, different aspects of the disclosure may be implemented in many different forms and should not be construed as limited to the aspects set forth herein; rather, these aspects are provided so that this disclosure will be thorough and complete, and will fully convey the scope of the aspects to those skilled in the art. Aspects may be practiced as methods, systems or devices. It must be noted that, as used in this specification, the singular forms "a," "an," and "the" include plural referents unless the context clearly dictates otherwise.

As used herein, the terms "axial" and "axially" refer to directions and orientations which extend substantially parallel to a rotatable shaft of the turbine. Moreover, the terms "radial" and radially" refer to directions and orientations which extend substantially perpendicular to the shaft of the turbine. In additional, the terms "circumferential" and "circumferentially" refer to directions an orientations which extend arcuately about the shaft of the turbine. The term "fluid," as used herein includes any medium or material that flows, including, but not limited to air and water.

Throughout this description, references to orientation (e.g., front(ward), rear(ward), top, bottom, back, right, left, upper, lower, etc.) of the turbine relate to its orientation as illustrated in the accompanying drawings and are used for ease of description only. No restriction is intended by use of the terms regardless of how the turbine may be situated.

Aspects described herein are directed to a turbine, which may be easily assembled, and may be manufactured using readily available and/or affordable parts. In some examples, aspects of the turbine enclosure may be manufactured from any of a variety of metals, woods, plastics, and/or composite materials, or any combination thereof. In other examples, the rotor assembly of the turbine may be manufactured from similar or different materials as compared to the turbine enclosure.

The rotor assembly of the turbine may include a plurality of blades, wherein each blade may be substantially cylindrical. As compared to more-traditional airfoil blades, cylindrical blades may be cheaper to manufacture and easier to assemble, thereby reducing the overall cost and difficult associated with manufacturing a turbine according to aspects disclosed herein. In an example, the blades may be in a fixed orientation with respect to the rotor assembly, while in another example, the blades may rotate on an axis parallel to a rotation axis of the rotor assembly. Some blades may be manufactured from a different material than other blades, such that a lightweight material may be used for some blades (e.g., wood, plastic, etc.), while a heavier material may be used for other blades (e.g., metal, ceramic, etc.). Accordingly, when the rotor assembly rotates within the turbine enclosure, the heavier blades may serve to increase the momentum of the rotor assembly, such that the rotor assembly may maintain its speed for a longer duration of time and/or have higher torque. Thus, the weight of the blades may control the torque of the turbine, while the spacing and/or quantity of the blades may affect the rotations per minute achieved by the rotor assembly. Such parameters may be changed to manufacture a turbine having a specific set of characteristics.

As discussed in greater detail below, aspects of the turbine disclosed herein may have a variety of applications, including, but not limited to, generating electricity, suction, and/or pressure. In another example, the turbine may be used to provide mechanical power (e.g., via a shaft coupled to the rotor assembly) harnessed from the flow of a fluid. Aspects disclosed herein may be used in conjunction with any of a variety of fluids, such as air or water. In some examples, a turbine may be mounted on a car or other vehicle, such that moving air (e.g., as a result of the vehicle's movements, the atmosphere surrounding the vehicle, etc.) may be captured by the turbine. As an example, the turbine may be used to capture wind in order to slow the speed of the vehicle. Such a scenario may offer a more productive alternative to traditional braking techniques, as the proposed application will capture energy as compared to the mere heat generation of traditional brakes. In other examples, the turbine may be used to capture energy from water, as may be achieved by placing the turbine in a river or stream, connecting the turbine to a pipe, or mounting the turbine on a boat or other vessel. While example applications of the disclosed turbine are discussed, it will be appreciated that aspects of the present disclosure are not so limited.

With these broad concepts in mind, several examples of turbines are discussed below. For example, FIG. 1 depicts a front right perspective view of an example turbine 100. As discussed herein, the turbine 100 may be used with any of a variety of fluids. In some examples, the turbine 100 may be suited for gaseous fluids, such as air. As illustrated, the turbine 100 includes a scoop 104, an enclosure bottom 106, an enclosure top 108, a vane 110, an enclosure left side 122, and an enclosure right side 124. As discussed above, the enclosure housing (e.g., including the enclosure bottom 106, the enclosure top 108, the enclosure left side 122, and the enclosure right side 124) may be manufactured from any of a variety of materials. The materials may be selected based on weight, durability, and/or cost considerations, among others.

In the example, the front enclosure housing defines an intake opening 102 and a rear of the enclosure housing defines an exhaust opening 120. In some examples, the intake opening 102 may be at least partially be surrounded by the scoop 104. As illustrated, the arrows 103 and 105 indicate a fluid flow direction through the intake and exhaust, respectively, of the turbine 100. Thus, a fluid may enter the turbine 100 by way of the scoop 104, and may exit the turbine 100 on the reverse side of the turbine 100 indicated by the arrow 105. In some examples, the intake of the turbine 100 may have a smaller opening area than that of the exhaust opening. As an example, the ratio of the intake to the exhaust may be 1.5, such that the exhaust may have 150% of the area as compared to the intake. In other examples, a different ratio may be used, or the intake may have a larger area than that of the exhaust. In yet another example, the intake and the exhaust may have similarly sized openings.

The enclosure housing defines an interior cavity in which a rotor assembly 125 (shown in FIGS. 4 and 5) is rotatably disposed. As described above, one method to capture the rotational energy of the rotor assembly 125 is to drive a shaft (not shown) that is connected to, for example, a power generation unit. As such, a shaft opening 109 may be defined within the enclosure top 108 so that the drive shaft may be coupled to the rotor assembly and extend from the enclosure housing. In the example, the shaft opening 109 is aligned with the rotation axis of the rotor assembly. Additionally or alternatively, a corresponding shaft opening 107 (shown in FIG. 4) may be defined within the enclosure bottom 106.

The vane 110 may be rigidly coupled to the enclosure housing at the rear to ensure that the turbine 100 maintains an appropriate orientation with respect to the flow of the fluid entering the scoop 104. As an example, the turbine 100 may be mounted such that it may rotate freely. Accordingly, the vane 110 may orient the turbine 100 to be substantially parallel to the flow of the fluid, thereby increasing the rate at which the fluid may flow through the turbine 100. In other examples, the vane 110 may be omitted, such as examples in which the turbine 100 is not mounted to rotate freely. In another example, the scoop 104 may be omitted, or may have a different shape. As an example, an elongated or differently shaped scoop may be used to channel fluid to the turbine 100 in scenarios in which the turbine 100 is mounted away from the general flow of the fluid. In an example, the scoop 104 may be stamped and folded from a sheet of metal or may be cast or molded, among other manufacturing techniques. The scoop 104 may have an inlet area that is greater than an outlet area that is positioned adjacent to the intake opening. This shape facilitates increasing the pressure of the fluid flow as it is channeled through the intake so as to increase performance of the turbine 100. In further examples, the scoop 104 may be removeably coupled to the enclosure housing so that is can be attached or removed as required or desired.

Figure 2:
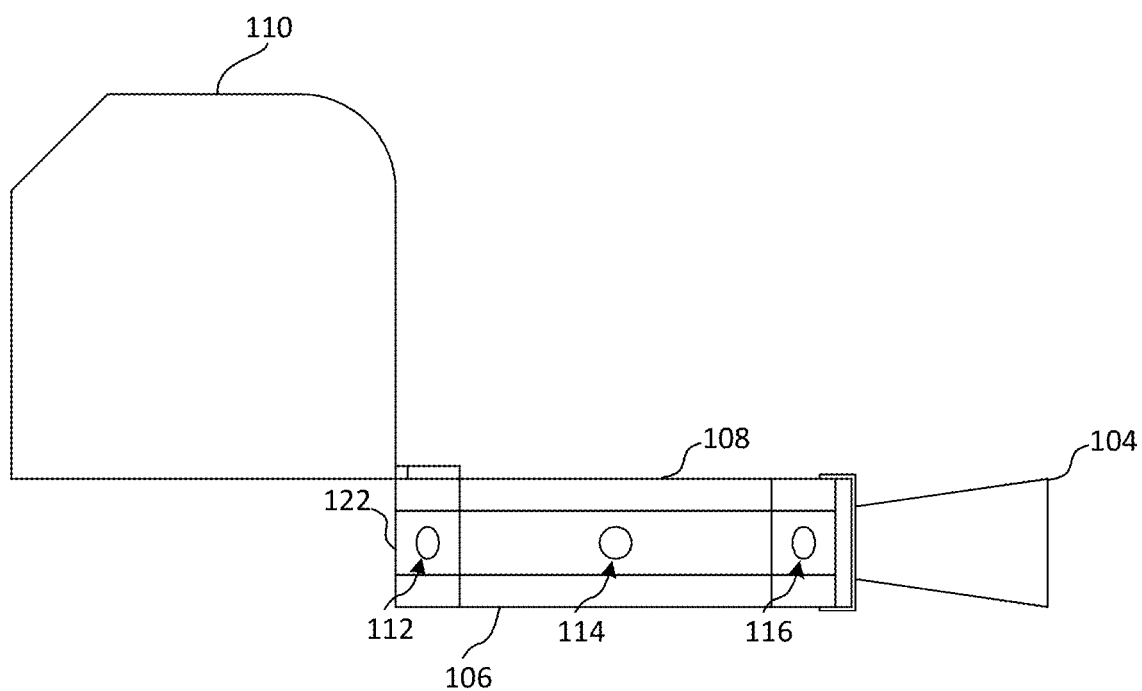
FIG. 2 depicts a left side view of the example turbine of FIG. 1.

FIG. 2 depicts a left side view of the example turbine 100 of FIG. 1. A number of elements depicted in FIG. 2 are described above in the context of FIG. 1 and, thus, are not necessarily described further. As illustrated, the enclosure left side 122 of the turbine 100 is between the bottom enclosure 106 and the top enclosure 108. The enclosure left side 122 may be coupled between the bottom enclosure 106 and the top enclosure 108 using any of a variety of means, including, but not limited to, one or more fasteners, adhesives, and/or welds. In some examples, the enclosure left side 122 may define a set of openings 112, 114, and 116.

Figure 3:
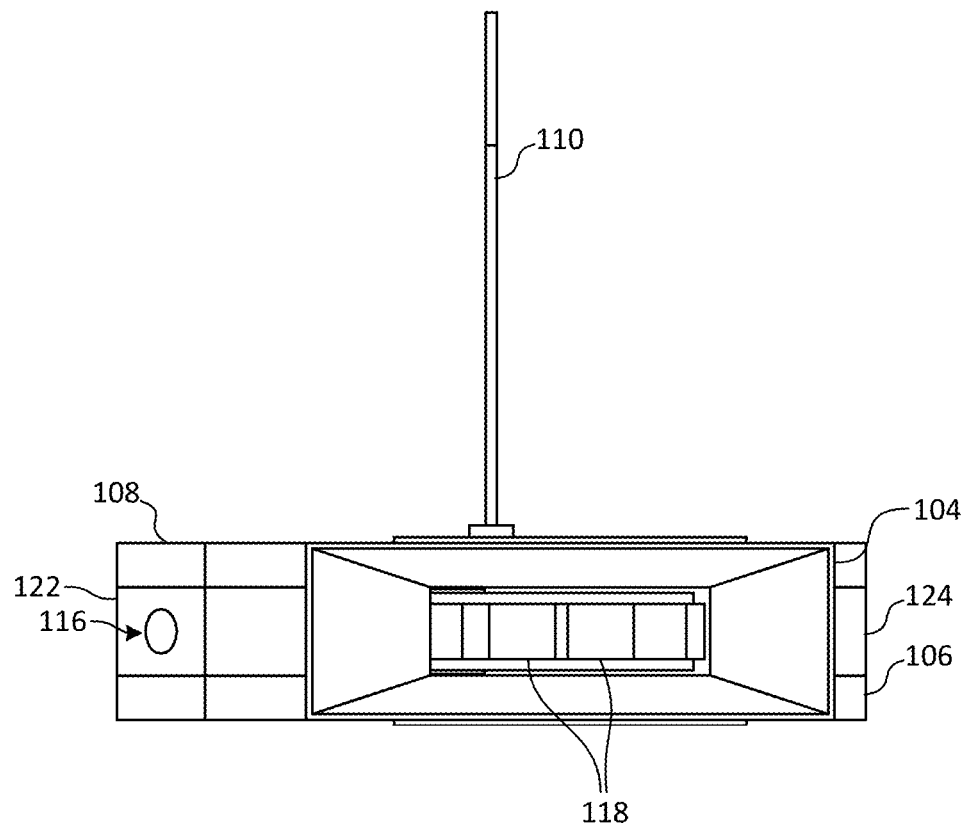
FIG. 3 depicts a front view of the example turbine of FIG. 1.

FIG. 3 depicts a front view of the example turbine 100 of FIG. 1. A number of elements depicted in FIG. 3 are described above in the context of FIGS. 1 and 2 and, thus, are not necessarily described further. Similar to the enclosure left side 122 discussed above, the enclosure right side 124 may be coupled between the bottom enclosure 106 and the top enclosure 108 using any of a variety of means, including, but not limited to, one or more fasteners, adhesives, and/or welds.

Blades 118 are illustrated as part of the rotor assembly of the turbine 100. As discussed above, each of the blades 118 may be substantially cylindrical. Thus, when a fluid enters the turbine 100 via the scoop 104, the fluid may exert a pushing force on the near side (from the front perspective of the turbine 100) of at least some of the blades 118. Similarly, as the fluid moves from the intake 102 toward the exhaust 120, the far side of at least some of the blades 118 may experience a suction force. The pushing force and/or the suction force may thereby cause the rotor assembly of the turbine 100 to move and rotate counterclockwise.

In some examples, the blades 118 may be in a fixed orientation with respect to the rotor assembly, while in another example, the blades may rotate on an axis that is parallel to a rotation axis of the rotor assembly. In other examples, some blades may be manufactured from a different material than other blades, such that a lightweight and/or low-cost material may be used for some blades (e.g., wood, plastic, etc.), while a heavier and/or more expensive material may be used for other blades (e.g., metal, ceramic, etc.). Accordingly, when the rotor assembly rotates within the turbine 100, the heavier blades may serve to increase the momentum of the rotor assembly, such that the rotor assembly may maintain its speed for a longer duration of time. Thus, the respective weights of the blades 118 may control the torque of the turbine 100, while the spacing and/or quantity of the blades 118 may affect the rotations per minute achieved by the rotor assembly. Such parameters may be changed to manufacture a turbine having a specific set of characteristics.

A butterfly valve, not pictured, may be positioned at the opening of the scoop 104 or at the back of the scoop 104 within the turbine 100, so as to control the rate at which the fluid enters the turbine 100. Thus, the butterfly valve may be useable to increase or decrease the amount of output generated by the turbine 100 based on the configuration of the butterfly valve.

Figure 4:
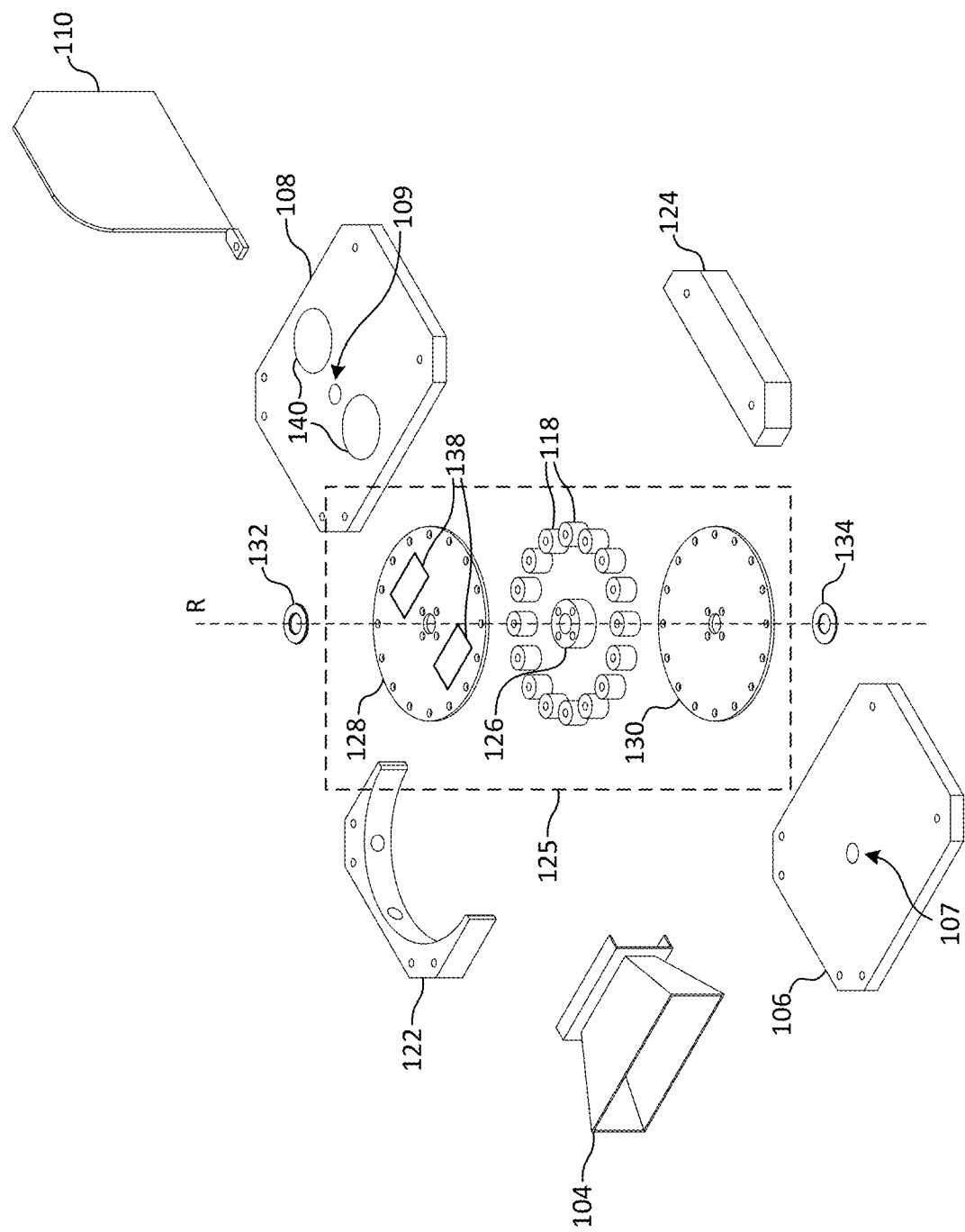
FIG. 4 depicts an exploded view of the example turbine of FIG. 1.

FIG. 4 depicts an exploded view of the example turbine 100 of FIG. 1. A number of elements depicted in FIG. 4 are described above in the context of FIGS. 1-3 and, thus, are not necessarily described further. The rotor assembly 125 includes a top disc 128, a bottom disc 130, the blades 118, and a spacer 126 all rotatable about a rotation axis R. In the example, the discs 128, 130 are substantially circular in shape and are spaced apart by the spacer 126. The spacer 126 is centered about the rotation axis R, which may receive a shaft (not shown) that is rotated by the rotor assembly 125. The blades 118 are spaced circumferentially around the rotation axis R and between the two discs 128, 130.

In some examples, the top disc 128 and the bottom disc 130 may be coupled together by way of the blades 118, such as by rivets, pins, or screws, among other means. In other examples, the top disc 128 and the bottom disc 130 may be coupled by way of the spacer 126. In another example, the spacer 126 may be omitted, or may be a bearing. The bushings 132 and 134 may reduce the friction between the rotor assembly 125, the enclosure bottom 106, and the enclosure top 108 as the rotor assembly 125 spins within the turbine 100. It will be appreciated that the bushings 132 and 134 are provided as an example means for positioning the rotor assembly 125 within the turbine 100. In other examples that include a shaft positioned within openings 107 and/or 109 of the bottom enclosure 106 and the top enclosure 108, respectively, the bushings 132 and 134 may also be configured as bearings so as to rotatably support the shaft that is coupled to the rotor assembly 125.

In some examples, the turbine 100 may include additional components useable to generate electricity based on the movement of the rotor assembly 125 in the turbine 100. As an example, a plurality of magnets 138 may be included in the rotor assembly 125, such that the movement of the rotor assembly 125 will cause a changing magnetic field within the turbine 100. Accordingly, one or more copper discs 140 may be placed on the top enclosure 108 (or other surface of the turbine enclosure), thereby generating electricity as a result of the changing magnetic field within the turbine 100 with respect to the copper discs 140. As another example, the rotor assembly 125 may be coupled to a shaft, such that the rotation of the rotor assembly 125 will cause the shaft to move. The shaft may then be coupled to an electric generator, which may convert the rotational energy of the shaft into electricity. In an example, the generated electricity may be used to power one or more electric motors of a vehicle, or to charge batteries, among other uses.

Figure 5:
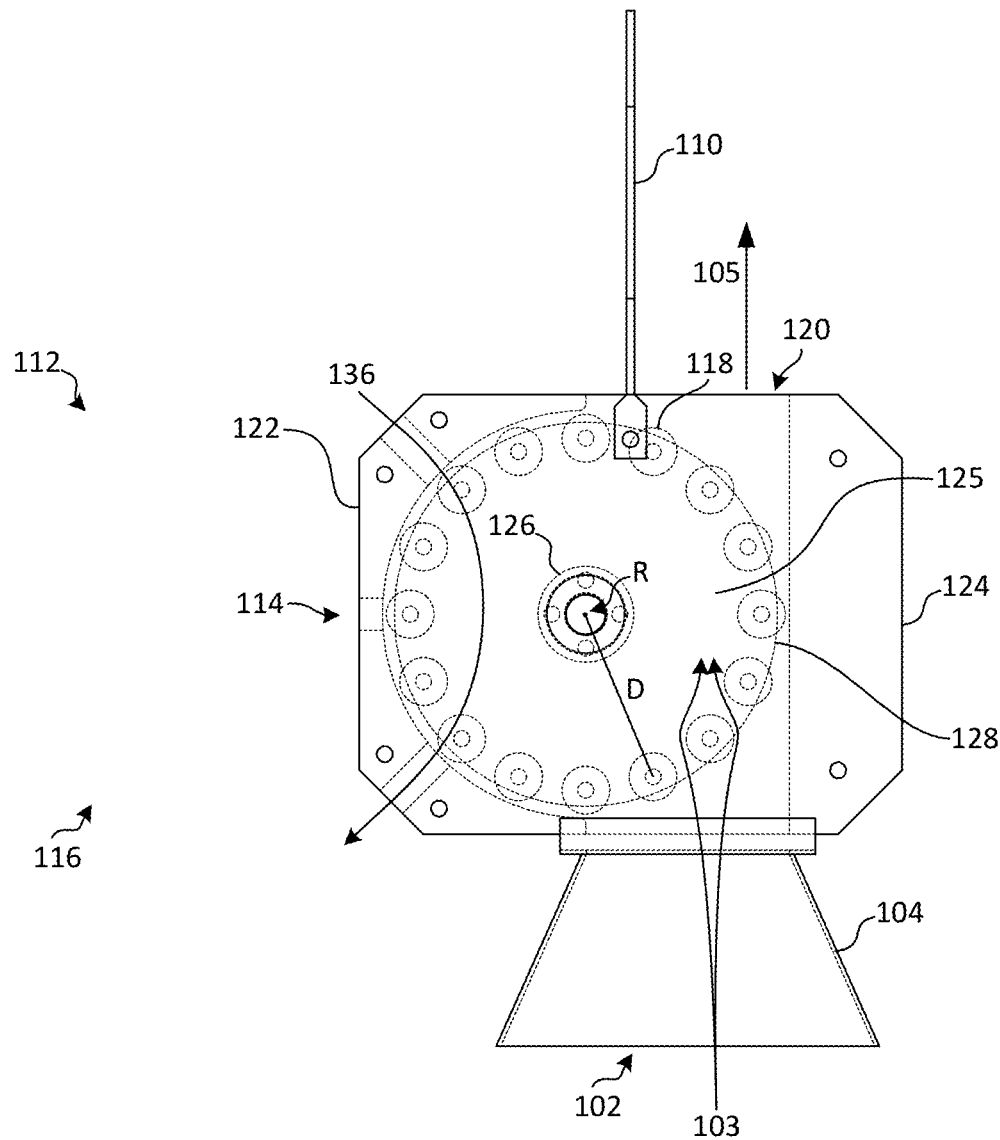
FIG. 5 depicts a top down view of the example turbine of FIG. 1.

FIG. 5 depicts a top down view of the example turbine 100 of FIG. 1. A number of elements depicted in FIG. 5 are described above in the context of FIGS. 1-4 and, thus, are not necessarily described further. Certain elements (e.g., openings 112, 114, and 116, as well as aspects of the rotor assembly 125) are illustrated using dashed lines to indicate they are interior to the turbine 100, and are covered by the enclosure top 108. As discussed above, the blades 118 are coupled between the circular discs 128, 130 and circumferentially spaced about the rotation axis R. Additionally, the blades 118 are radially positioned away from the rotation axis R a distance of D. As such, all of the blades 118 are aligned along the outer perimeter of the discs 128, 130 and are in a tight clearance fit with the left and right enclosure sides 122, 124. For example, the clearance between the blades 118 and the enclosure sides 122, 124 maybe as small as a three-thousandths of an inch. In other examples, the blades 118 may be configured in more than one radial rows, or be positioned in varying radial distances away from the rotation axis R.

FIG. 5 further illustrates the flow of fluid through the turbine 100, such that fluid may flow starting at arrow 102, into the scoop 104, and past at least some of the blades 118, thereby causing the rotor assembly 125 to rotate counterclockwise. In the example, the intake is positioned towards the right enclosure side 124 and offset towards the right from the rotation axis R. In other examples, the intake may be positioned at any other location on the enclosure housing as required or desired. As described above, the fluid flow contacts a leading edge of the blade 118 forming a pressure side of the blade 118 which induces the rotor assembly 125 to rotate about the rotation axis R. Additionally, as the fluid flow travels around the blade 118, a trailing edge of the blade 118, with respect to the direction of fluid flow, forms a suction side of the blade 118 which further induces rotation about the rotation axis R. Subsequently, the fluid may exit the turbine 100 through the exhaust, as indicated by the arrow 120. In the example, the exhaust is also positioned towards the right enclosure side 124, offset towards the right from the rotation axis R, and in line with the intake. In other examples, the intake may be positioned at any other location on the enclosure housing as required or desired (e.g., offset from the intake position).

As the rotor assembly of the turbine 100 rotates in the counterclockwise direction and because the intake and the exhaust are positioned adjacent to the right side enclosure 124, a suction force and a pressure force are also generated along the left side enclosure 122. Accordingly, a suction opening 112 may be disposed towards the rear of the left side 122 and a pressure opening 116 may be disposed towards the front of the left side 124. This enables a secondary flow of fluid 136 to be channeled along the left side of the turbine 100 to further induce rotation of the rotor assembly 125 and increase performance. In the example, the suction opening 112 and the pressure opening 116 extend at approximately 45° angles relative to the intake direction, with the suction opening 112 being rotated 90° in relation to the pressure opening 116.

In some examples, the opening 114 may be provided between the suction opening and the pressure opening in order to manage the fluid pressure within the turbine 100. The opening 114 may extend at an orthogonal angle relative to the intake direction. In some examples, the forces generated at the openings 112 and 116 may vary depending on the proximity of the rotor assembly of the turbine 100 to the interior wall of the enclosure left side 122. In other examples, one or more of openings 112, 114, and 116 may be omitted, or may have control valves so as to regulate the secondary flow of fluid 136. Further, one or more of the openings 112, 114, and 116 may extend in any other direction as required or desired in relation to the intake direction.

As shown, the blades 118 and the rotor assembly 125 have a small amount of clearance with respect to the left enclosure side 122. This serves to generate the suction and pressure forces discussed above with respect to the openings 112 and 116, respectively. While 16 blades 118 are illustrated as part of the rotor assembly 125, it will be appreciated that additional or fewer blades may be used without departing from this disclosure. Further, blades 118 are illustrated as being evenly spaced, though a variety of other spacing techniques may be used.

Figure 7:
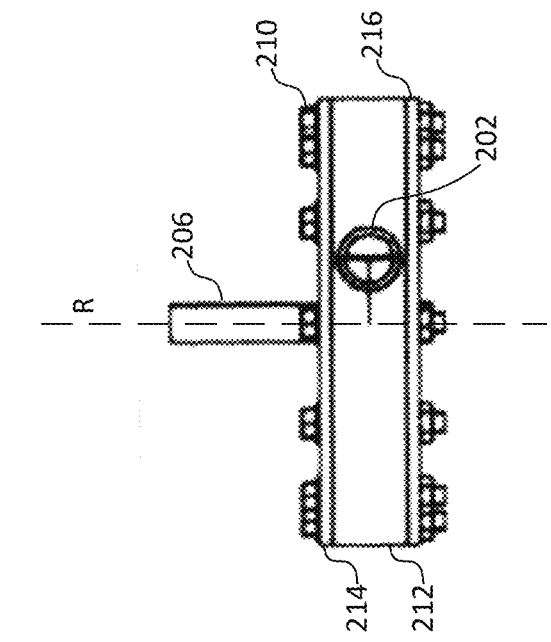
FIGS. 6 and 7 depict top and front views, respectively, of another example turbine.
Figure 6:
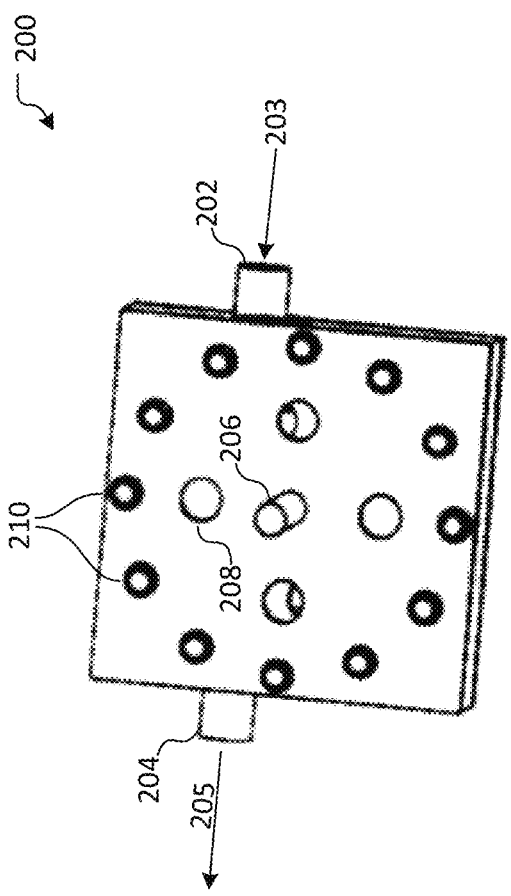

FIGS. 6 and 7 depict top and front views, respectively, of another example turbine 200. Referring concurrently to FIGS. 6 and 7, the turbine 200 may be used with any of a variety of fluids. As illustrated, the turbine 200 includes an intake 202, an exhaust 204, a shaft 206, a set of openings 208, and fasteners 210. The rotor assembly of the turbine 200 is rotatably disposed within an enclosure top 214, an enclosure middle 212, and an enclosure bottom 216. In the instant example, the fasteners 210 are used to couple the enclosure top 212, the enclosure middle 212, and the enclosure bottom 216. It will be appreciated that while the turbine 200 is described as using the fasteners 210, other means may be used. As discussed above, the enclosure (e.g., including the enclosure top 214, the enclosure middle 212, and the enclosure bottom 216) may be manufactured from any of a variety of materials. The materials may be selected based on weight, durability, and/or cost considerations, among others. As compared to the turbine 100, the turbine 200 includes a different enclosure configuration, wherein the enclosure middle 212 is one piece, whereas the turbine 100 includes an enclosure left side 122 and an enclosure right side 124.

In an example, the arrows 203 and 205 indicate a fluid flow direction through the turbine 200, wherein the fluid may enter the turbine 200 via the intake 202. Accordingly, the fluid may flow past one or more blades of the rotor assembly of the turbine 200. As a result, the shaft 206, which may be coupled to the rotor assembly, may rotate about the rotation axis R of the rotor assembly, thereby capturing some of the energy of the fluid to produce mechanical work. The fluid continues through the turbine 200 to the exhaust 204, where it ultimately exits the turbine 200. In some examples, the openings 208 may be provided to maintain, regulate, or otherwise limit the interior pressure of the turbine 200. In other examples, one or more of the openings 208 may be omitted. As an example, the openings 208 may be omitted in some instances where the fluid is a liquid.

Figure 9:
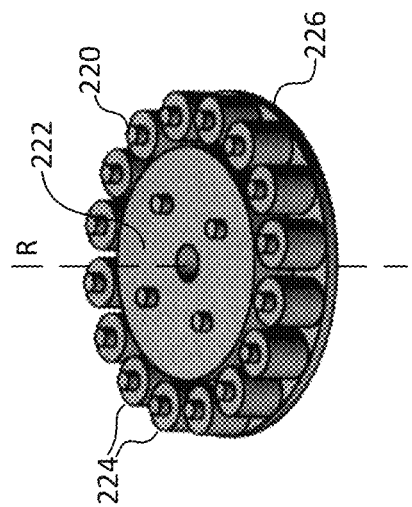
FIG. 9 depicts a partial perspective view of the example turbine of FIG. 6.
Figure 8:
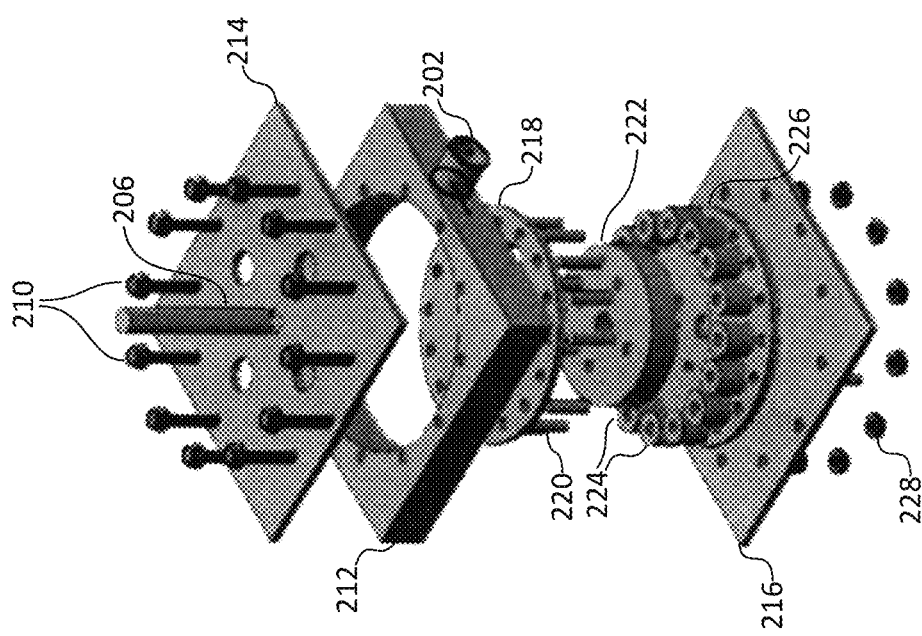
FIG. 8 depicts an exploded view of the example turbine of FIG. 6.

FIG. 8 depicts an exploded view of the example turbine 200 of FIG. 6, while FIG. 9 depicts a partial perspective view of the example turbine 200. A number of elements depicted in FIGS. 8 and 9 are described above in the context of FIGS. 6 and 7 and, thus, are not necessarily described further. FIGS. 8 and 9 are described simultaneously. As illustrated, the rotor assembly of the turbine 200 includes a top disc 218, a set of pins 220, a spacer 222, a set of blades 224, and a bottom disc 226, all of which are rotatable about the rotation axis of the rotor assembly. FIG. 8 further illustrates that the fasteners 210 interface with a set of nuts 228 to fasten the enclosure top 214, the enclosure middle 212, and the enclosure bottom 216.

Similar to the turbine 100 discussed above with respect to FIGS. 1-5, the blades 224 may be substantially cylindrical. Thus, when a fluid enters the turbine 200 via the intake 202, the fluid may exert a pushing force on the near side of at least some of the blades 224. As the fluid moves from the intake 202 to the exhaust 204, the far side of at least some of the blades 224 may experience a suction force. The pushing force and/or the suction force may thereby cause the shaft 206 of the turbine 200 to rotate counterclockwise.

The blades 224 may be positioned between the top disc 218 and the bottom disc 226 by the pins 220, which may allow the blades 224 to rotate, or may maintain the blades 224 in a fixed position with respect to the rotor assembly. In an example, the set of blades 224 are spaced circumferentially around the rotation axis R between the two discs 218, 226. While the turbine 200 is described with respect to pins 220, it will be appreciated that fasteners or other means may be used to retain the blades 224 between the top disc 218 and the bottom disc 226. In other examples, some of the blades 224 may be manufactured from a different material than others, such that a lightweight and/or inexpensive material may be used for some blades (e.g., wood, plastic, etc.), while a heavier and/or more expensive material may be used for other blades (e.g., metal, ceramic, etc.). In such examples, the heavier blades may be opposed from one another, so as to maintain the balance of the rotor assembly. Accordingly, when the rotor assembly rotates within the turbine 200, the heavier blades may serve to increase the momentum of the rotor assembly, such that the rotor assembly may maintain its speed for a longer duration of time. Thus, the weight of the blades 224 may control the torque of the turbine 200, while the spacing and/or quantity of the blades 224 may affect the rotations per minute achieved by the rotor assembly. Such parameters may be changed to manufacture a turbine having a specific set of characteristics.

In another example, the spacer 222 may provide additional mass to the rotor assembly, thereby increasing the momentum of the rotor assembly when rotating within the turbine 200. As such, similar to adding mass to the blades 224, the torque and/or spin-down time of the turbine 200 may be controlled at least in part by the mass of the spacer 222.

In some examples, the turbine 200 may include additional components useable to generate electricity based on the movement of the rotor assembly in the turbine 200, similar to those discussed above with respect to the turbine 100. As an example, a plurality of magnets, not pictured, may be added to the rotor assembly (e.g., as part of the spacer 222), such that the movement of the rotor assembly will cause a changing magnetic field within the turbine 200. Accordingly, copper discs may be placed on the top enclosure 214 and/or the bottom enclosure 216, thereby generating electricity as a result of the changing magnetic field within the turbine 200. As another example, the shaft 206 may be coupled to an electric generator, which may convert the rotational energy of the shaft 206 into electricity.

As compared to the turbine 100, the turbine 200 is an example in which there is a narrower channel for a fluid flow to pass through the turbine 200. Specifically, rather than having a left enclosure side 122 and a right enclosure side 124, which form an asymmetrical enclosure housing for the rotor assembly 125, the enclosure housing of the turbine 200 is substantially cylindrical, such that the blades 224 maintain a similar distance from the enclosure housing as they rotate about the rotation axis R. Similarly, the spacer 222 is larger, as compared to the spacer 126 of the turbine 100, thereby further restricting or directing the path of a fluid flow within the turbine 200.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

The invention claimed is:

1. A turbine comprising:
a turbine enclosure comprising a top, a bottom, a first side, and a second side, wherein an intake is defined at least partially on the first side of the turbine enclosure and an exhaust is defined at least partially on the second side of the turbine enclosure, such that the turbine enclosure is configured to receive a fluid flow therethrough, and wherein the second side is opposite the first side of the turbine enclosure; and
a rotor assembly rotatably coupled between the top of the turbine enclosure and the bottom of the turbine enclosure, wherein the rotor assembly defines a rotation axis, the rotor assembly comprising:
at least one disc disposed about the rotation axis; and
a set of substantially cylindrical blades, wherein:
each cylindrical blade of the set of cylindrical blades is fixably coupled to the at least one disc, is circumferentially spaced about the rotation axis, and has a clearance with respect to the turbine enclosure; and
the set of substantially cylindrical blades is at least partially disposed between the intake and the exhaust, such that when the fluid flow is channeled through the turbine enclosure via the intake and the exhaust, the fluid flow travels around a blade of the set of blades such that a first side of the blade experiences a pushing force and a second side of the blade substantially opposed to the first side experiences a suction force, thereby causing the rotor assembly to rotate within the turbine enclosure.

2. The turbine of claim 1, wherein the rotor assembly further comprises a plurality of magnets, wherein the top of the turbine enclosure comprises a set of copper discs, and wherein upon rotation of the rotor assembly, the magnetic field between the plurality of magnets and the set of copper discs changes to generate electricity.

3. The turbine of claim 1, wherein a third side of the turbine enclosure defines at least one of an exhaust opening, a suction opening, and a pressure opening.

4. The turbine of claim 1, further comprising a vane disposed on the top of the turbine enclosure.

5. The turbine of claim 3, wherein the exhaust opening extends substantially normal to a direction of the intake.

6. The turbine of claim 3, wherein both the suction opening and the pressure opening extend at a 45° angle relative to a direction of the intake, and wherein a secondary fluid flow is channeled through the turbine enclosure via the suction opening and the pressure opening.

7. The turbine of claim 6, wherein the suction opening is offset 90° relative to the pressure opening.

8. The turbine of claim 1, wherein the rotor assembly comprises two spaced apart discs, the set of blades extending between the two spaced apart discs and substantially parallel to the rotation axis.

9. The turbine of claim 1, wherein an inlet size of the intake is approximately equal to an outlet size of the exhaust.

10. The turbine of claim 1, wherein a first cylindrical blade of the set of cylindrical blades has a first weight and a second cylindrical blade of the set of cylindrical blades has a second weight, and wherein the first weight and the second weight are different.

11. The turbine of claim 10, wherein the set of cylindrical blades comprises a third cylindrical blade having a weight substantially similar to the first weight, and wherein the first cylindrical blade and the third cylindrical blade are diametrically opposed to each other on the at least one disc.

12. The turbine of claim 1, further comprising a shaft opening defined on the top of the turbine enclosure.

13. The turbine of claim 12, wherein the rotor assembly further comprises a shaft coupled to the at least one disc, and wherein the shaft extends through the turbine enclosure through the shaft opening.

14. The turbine of claim 13, wherein the shaft is coupled to an electric generator, and wherein upon rotation of the rotor assembly, the shaft rotates to generate electricity.

15. The turbine of claim 8, wherein the rotor assembly comprises a spacer, the spacer extending between the two spaced apart discs and substantially parallel to the rotation axis.

16. The turbine of claim 1, wherein the turbine enclosure defines an interior cavity, wherein the interior cavity is substantially cylindrically shaped and centered about the rotational axis.

17. The turbine of claim 1, wherein the rotor assembly is rotatably coupled between the top of the turbine enclosure and the bottom of the turbine enclosure by a first bushing disposed on the top of the turbine enclosure and a second bushing disposed on the bottom of the turbine enclosure.

18. The turbine of claim 1, wherein:

the turbine enclosure further comprises a third side and a fourth side, wherein the third side is opposite the fourth side; and the clearance is a first clearance with respect to the third side of turbine enclosure and there is a second clearance with respect to the fourth side of the turbine enclosure, wherein the first clearance and the second clearance are different.

* * * * *